(12) United States Patent
Matsumoto et al.

(10) Patent No.: US 6,574,081 B1
(45) Date of Patent: Jun. 3, 2003

(54) DC-DC CONVERTER

(75) Inventors: Tadahiko Matsumoto, Kanagawa-ken (JP); Hitoshi Tsuji, Tokyo-to (JP); Jun Nagai, Kanagawa-ken (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 129 days.

(21) Appl. No.: 09/717,916

(22) Filed: Nov. 21, 2000

(30) Foreign Application Priority Data

Nov. 30, 1999 (JP) .......................................... 11-340123

(51) Int. Cl.⁷ ............................................. H02H 7/125
(52) U.S. Cl. .............................. 361/18; 361/20; 363/50; 323/276
(58) Field of Search .............................. 361/18, 20, 35, 361/38; 363/15, 21.08, 50, 28; 323/284, 276

(56) References Cited

U.S. PATENT DOCUMENTS 4,024,437 A * 5/1977 Suzuki ........................ 361/18
4,586,120 A * 4/1986 Malik et al. .............. 363/21.16
5,499,154 A * 3/1996 Cullison ...................... 323/901

FOREIGN PATENT DOCUMENTS

| JP | 7-298483 | 11/1995 |
| JP | 8-234852 | 9/1996 |
| JP | 9-308237 | 11/1997 |
| JP | 11-168883 | 6/1999 |

* cited by examiner

*Primary Examiner*—Kim Huynh
(74) *Attorney, Agent, or Firm*—Keating & Bennett, LLP (57) ABSTRACT

A DC-DC converter has a primary-side circuit connected to a DC power supply and a converter for converting voltage supplied by the DC power supply into an AC signal; a secondary-side circuit for rectifying and smoothing the AC signal transmitted from the primary-side circuit to supply power to a load; and an auxiliary rectifying and smoothing circuit for rectifying and smoothing the AC signal transmitted from the primary-side circuit to supply sub-power supply voltage to the converter of the primary-side circuit. The primary-side circuit further has a monitoring circuit for monitoring the sub-power supply voltage supplied from the auxiliary rectifying and smoothing circuit to the converter and a stop circuit for latching a conversion operation of the converter into an OFF state.

14 Claims, 4 Drawing Sheets

DC-DC CONVERTER

BACKGROUND OF THE INVENTION

1. Field of the Invention

The present invention relates to a DC-DC converter for converting a voltage of a DC (Direct Current) power supply, and more specifically, it relates to an improvement in an output low voltage protection function which stops supply of power when a short circuit occurs in the load.

2. Description of the Related Art

Figure 4:
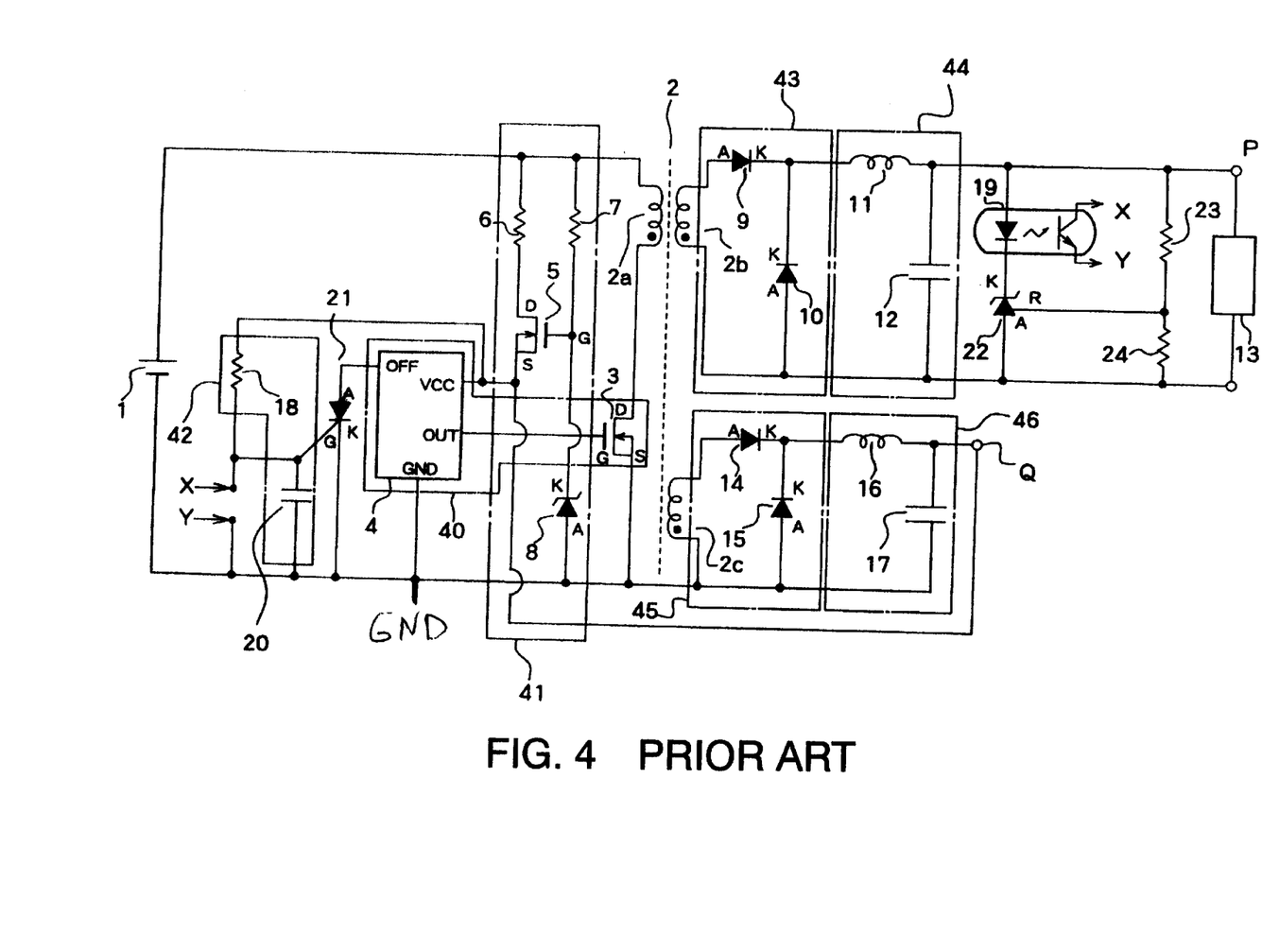
FIG. 4 is a circuit diagram of a conventional DC-DC converter.

A conventional DC-DC converter is explained according to FIG. 4. FIG. 4 is a circuit diagram showing an example of a conventional DC-DC converter unit. Incidentally, an explanation is made by using a flyback converter as an example. As shown in FIG. 4, the conventional DC-DC converter consists of a DC power supply 1, a transformer 2, a PWM (Pulse Width Modulation) modulation section 40, a power supply selection section 41, a time constant determination section 42, a thyristor 21, a first rectifier section 43, a first smoothing section 44, a photocoupler 19, a shunt regulator 22, dividing resisters 23 and 24, a second rectifier section 45, and a second smoothing section 46.

Furthermore, the PMW modulation section 40 consists of a PWM control IC 4 and a main switch 3. The PMW control IC 4 is provided with a power supply terminal (Vcc), a signal output terminal (OUT), an operation control input terminal (OFF), and a GND terminal. The power supply selection section 41 consists of a first FET (N channel MOSFET) 5, a first resistor 6, a second resistor 7 and a Zener diode 8. The time constant determination section 42 consists of a resistor 18 and a capacitor 20. The first rectifier section 43 is provided with two diodes 9 and 10. The first smoothing section 44 is provided with a choke coil 11 and a capacitor 12. Moreover, the second rectifier section 45 is provided with two diodes 14 and 15. The second smoothing section 46 is provided with a choke coil 16 and a capacitor 17. Incidentally, in this case, the main switch 3 consists of an FET (hereinafter referred to as a second FET for discrimination).

In a first FET 5 in the power supply selection section 41, the drain terminal (D) and the gate terminal (G) are respectively connected to a positive pole side of a DC power supply 1 via the first resistor 6 and the second resistor 7. The gate terminal (G) of the first FET 5 is also connected to a cathode terminal (K) of the Zener diode 8. An anode terminal (A) of the Zener diode 8 is connected to a negative pole side (hereinafter referred to as "GND"). Moreover, a source terminal (S) is connected to the power supply terminal (Vcc) of the PMW control IC 4 and to an output terminal Q of the second smoothing section 46.

A power supply terminal of the PWM control IC 4 of the PWM modulator 40 is connected to a terminal X of the photocoupler 19 via the resistor 18. The terminal X of this photo-coupler 19 is also connected to a gate terminal (G) of the thyristor 21 and is connected to GND via the capacitor 20. Moreover, a terminal Y of the photocoupler 19 is connected to GND. The anode terminal (A) and the cathode terminal (K) are connected to the operation control input terminal (OFF) of the PWM control IC 4 and GND respectively. The signal output terminal (OUT) of the PWM control IC 4 is connected to the gate terminal (G) of the second FET 3 and the GND terminal of the PWM control IC 4 is further connected to GND. Incidentally, a feedback signal of the output voltage is input to this PWM control IC 4 by an output voltage detection circuit and a feedback circuit which are not illustrated. A source terminal (S) of the main switch 3 is connected to GND and a drain terminal (D) thereof is connected to the positive pole side of the DC power supply via a primary winding 2a of a transformer 2.

Both ends of a secondary winding 2b of the transformer 2 are connected to a load 13 via the first rectifier section 43 and the first smoothing section 44, a terminal P side of this load 13 is connected to the anode terminal of the LED of the photocoupler 19, the cathode terminal of the photocoupler 19 is connected to the cathode terminal (K) of the shunt regulator 22. Moreover, the anode terminal (A) of this shunt regulator is connected to the other end of the load 13, a reference terminal (R) is connected to the terminal P side of the load 13 via the resistor 23 and is connected to the other end of the load 13 via the resistor 24.

Both ends of the third winding 2c of the transformer 2 are connected to the second smoothing section 46 via the second rectifier section 45. Incidentally, GND terminals of the second rectifier section 45 and the second smoothing section 46 are connected to GND respectively as they are shown.

Operations of the PWM modulation section 40 and the power supply selection section 41 are now explained. In the PWM modulation section 40, the PWM control IC 4 controls conduction of the main switch 3 by a PWM-controlled output signal to control the current flowing to the primary winding 2a of the transformer 2. Moreover, the PWM modulation section 40 stops output of the PWM-controlled signal when the operation control terminal (OFF) of the PWM control IC 4 is set to an L-level.

Furthermore, when the second smoothing section 46 does not supply sufficient sub-power supply voltage (when starting), the power supply selection section 41 turns the first FET 5 ON to supply power supply voltage of the DC power supply 1 supplied via the resistor 6 to the power supply terminal (Vcc) of the PWM control IC 4. When the second smoothing section 46 supplies sufficient sub-power supply (in a steady state), the power supply selection section 41 turns the first FET 5 OFF to supply the sub-power supply voltage outputted from the second smoothing section 46 to the power supply terminal (Vcc) of the PWM control IC 4 as it is shown.

Incidentally, the time constant determination section 42 is widely known, and a choke-input rectifying method which is well known is utilized for the first rectifier section 43, the first smoothing section 44, the second rectifier 45 and the smoothing section 46. Therefore, detailed explanations are omitted.

Next, operations of the conventional DC-DC converter shown in FIG. 4 are explained. First, an operation of this DC-DC converter when starting is explained. The voltage from the DC power supply 1 is applied to the gate electrode (G) of the first FET 5 via the resistor 7, and the gate electrode (G) is fixed at predetermined potential to GND by function of the Zener diode 8. On the other hand, since the voltage is not applied to the source terminal (S) of the first FET 5 at first, a potential difference is generated between the gate and source terminals to turn the first FET ON, and the voltage to be applied to the drain terminal (D) of the first FET 5 via the resistor 6 is transmitted to the power supply terminal (Vcc) of the PWM control IC 4 via the source terminal (S). Then, the PWM control IC 4 is turned ON to start, and a PWM modulated voltage signal (a gate driving pulse) is outputted from the output terminal OUT. Incidentally, in this case, the PWM control IC 4 is fed back to be inputted with output voltage. Thereby, the PWM control IC 4 performs operations to control the output voltage to a predetermined value.

Subsequently, the main switch 3 is switching-controlled by the gate driving pulse outputted from the PWM control IC 4, and a current between the drain electrode (D) and the source electrode (S), that is, the current flowing through the primary winding 2a of the transformer 2 from the DC power supply is converted to an AC current.

Then, a current in accordance with the number of wire turns is induced in the secondary winding 2b of the transformer, and a current in accordance with the number of wire turns is also induced in the tertiary winding 2c. A voltage signal generated on both ends of the secondary winding 2b of the transformer 2 is rectified by the first rectifier section 43, then, it is smoothed by the first smoothing section 44 and to be applied to a load 13 as a DC voltage signal.

On the other hand, the voltage signal generated on both ends of the tertiary winding 2c of the transformer 2 is converted to DC current by the second rectifier section 45 and the second smoothing section 46, and is supplied to the supply terminal (S) of the first FET 5 via a terminal Q as sub-power supply voltage. In this case, the sub-power supply voltage has a size that is proportional to the voltage applied to the load 13.

After the starting operation has been completed as explained above, since the sub-power supply voltage is applied to the source terminal (S) of the first FET 5, the potential difference between the source electrode (S) and the gate electrode (G) becomes zero, the first FET 5 is turned OFF. In other words, each circuit constant is decided so that the first FET 5 is turned OFF by a DC current that appears on the terminal Q when a predetermined voltage is applied to the primary winding 2a of the transformer 2. On the other hand, immediately after the first FET 5 has been turned OFF, since the DC current appearing on the terminal Q is supplied to the power supply terminal (Vcc) of the PWM control IC 4, the PWM control IC 4 keeps outputting the PWM modulated signal without any stop in operation. In this way, the PWM control IC 4 obtains a power supply from the DC power supply 1 only at the time of starting, and is supplied with power from the terminal Q during steady state operation. Thereby, conduction loss is prevented.

When the circuit comes to steady state operating an LED of the photocoupler 19 is turned ON by operations of dividing resistors 23 and 24 and the shunt regulator 22, then the terminal X is brought to conduction with the terminal Y. As a result, the voltage between the gate and cathode of the thyristor 21 comes to the L-level, and thyristor 21 goes to the L-level, and thyristor 21 is maintained in an OFF state.

In this case, if the voltage applied to the load 13 decreases because of a short circuit or the like of the load 13, the shunt regulator 22 causes cut off of conduction with the photocoupler 19, and the terminal X will not conduct with the terminal Y. After a predetermined time determined by the time constant circuit 42 has elapsed, the voltage between the gate and cathode of the thyristor 21 goes to the H-level, and the thyristor is turned ON. Then, a stop signal input terminal of the PWM control IC 4 comes to L-level, and the switching operation of the PWM control IC 4 is latched (a conversion operation to AC is stopped and the stop state is maintained). Thus, protection of the output low voltage is realized. Incidentally, although a state in which conduction between the photocoupler 19 and a short time the LED can be cut off for, in this case, the thyristor 21 is never turned ON, the switching operation of the PWM control IC 4 is prevented from latching by the time constant circuit.

However, in the conventional DC-DC converter mentioned above, since parts of large size and high cost such as the photocoupler and shunt regulator are employed to realize protection of the output low voltage, there have been problems in that miniaturization was difficult and the cost could not be reduced.

SUMMARY OF THE INVENTION

The present invention is made considering the above-mentioned situation, and it is the purpose of the present invention to provide a DC-DC converter which can be miniaturized and which reduces cost while realizing protection of the output low voltage.

To solve the conventional problem mentioned above, the invention comprises a DC-DC converter having:

a primary-side circuit connecting to a DC power supply source and provided with a converter for converting voltage supplied by said DC power supply into an AC voltage signal, a secondary-side circuit for rectifying and smoothing the AC signal transmitted from the primary-side circuit to supply to a load and auxiliary rectifying and smoothing circuit, the primary-side circuit further having a monitor for monitoring a sub-power supply voltage supplied from the auxiliary rectifying and smoothing circuit to the converter, and a latch for latching a conversion operation of the converter.

As described above, by utilizing a state in which the sub-power-supply voltage relates (for example, is proportional to) to the output voltage of the secondary-circuit side, by monitoring this sub-power supply voltage, that is, the power-source voltage in the primary-side circuit, a decrease in output voltage caused by short circuit of the load is detected to stop a conversion operation without employing an element having a large size such as a photo-coupler. Thus, miniaturization and cost reduction can be achieved while realizing protection of the output low voltage.

Furthermore, to solve the conventional problem mentioned above, the invention further includes, in the DC-DC converter, a primary-side provided with a DC power supply and a converter for converting voltage supplied by the DC power supply into an AC voltage signal and an auxiliary rectifying and smoothing circuit for rectifying and smoothing the AC signal transmitted from the primary-side circuit to output as a sub-power supply voltage, and having a power supply selection circuit for supplying the power supply voltage from the DC power source when the converter starts and selectively supplying the sub-power supply voltage from the auxiliary rectifying and smoothing circuit in a steady state and a stop circuit for monitoring the sub-power supply voltage to latch the operation of the converter when the sub-power supply voltage decreases.

Moreover, to solve the conventional problem mentioned above, in the DC-DC converter has an operation controller provided with an operation control terminal for controlling stopping of the conversion operation of the converter according to signals inputted to the operation control terminal and preventing latching during the controlling stopping of the conversion operation. Thereby, the DC-DC converter can be remote-controlled without being latched.

Moreover, to solve the conventional problem mentioned above, the DC-DC converter has an input low voltage protection circuit for monitoring the power supply voltage to control stopping of the conversion operation of the conversion circuit when the power supply voltage is lower than a predetermined voltage and for preventing latching during the controlling to stop. Thereby, protection of the input low voltage can be realized without being latched.

Moreover, to solve the conventional problem mentioned above, the converter is provided with a pulse-width conversion control element comprising a power supply terminal, a control terminal for stop controlling a conversion operation of pulse-width conversion and a terminal for inputting a signal whose pulse width is converted and a main switch element for receiving the signal whose pulse width is converted in the gate terminal to allow the drain terminal to conduct with the source terminal according to the signal whose pulse wave is converted, the power supply selection circuit includes a first transistor provided with a control input terminal which is fixed to a predetermined potential to ground potential, an input terminal supplied with the power-source voltage of the DC power supply and an output terminal supplied with the sub-power supply voltage, the first transistor allowing the input terminal to conduct with the output terminal to supply the power-source voltage from the DC power supply to the power supply terminal of the converter via the output terminal before the sub-power supply voltage reaches the predetermined potential and supplies the sub-power supply voltage to the power supply terminal of the converter without making the input terminal conduct with the output terminal when the sub-power supply voltage exceeds the predetermined potential, the stop circuit including a second transistor for sending a signal for stop control to the control terminal of the converter upon receiving the current signal at the input terminal of the first transistor.

According to the present invention, since in the DC-DC converter the sub-power supply voltage outputted by the auxiliary rectifying and smoothing circuit is monitored at the primary-side circuit side, when the monitor detects a decrease in the sub-power supply voltage, conversion operation to AC current is stopped, and the state of the secondary-side circuit is not needed to be transmitted to the primary-side circuit. As a result, by employing small-sized and low cost elements, miniaturization and cost reduction can be achieved while realizing protection of the output low voltage.

Furthermore, the DC-DC converter is constituted so that when a conversion circuit which is provided in the primary-side circuit and converts voltage from the DC power supply to an AC voltage signal is supplied with power supply voltage by the DC power supply when starting and is supplied with sub-power supply voltage by the auxiliary rectifying and smoothing circuit, the stop circuit monitors the sub-power supply voltage to stop conversion operations of the conversion circuit when the sub-power supply voltage decreases. Therefore, there is no need to transmit a state of the secondary-side circuit to the primary-side circuit. Thus, miniaturization and cost reduction can be achieved while realizing protection of the output low voltage by employing low cost elements.

Furthermore, the DC-DC converter unit is constituted so that an operation control circuit stop-controls conversion operations of a conversion circuit in accordance with a signal inputted to an operation control input terminal, and latching is prevented during a stop operation. Thus, the DC-DC converter unit can be remotely controlled without causing latch stop.

Furthermore, the DC-DC converter is constituted so that the input low voltage protection circuit monitors the power supply voltage to stop-control conversion operations of the conversion circuit, and latching is prevented during a stop operation. Thus, protection of the input low voltage can be realized.

Furthermore, the DC-DC converter is constituted so that the stop circuit has a structure which is realized by a transistor; thereby, miniaturization and cost reduction can be achieved while realizing protection of output low voltage.

For the purpose of illustrating the invention, there is shown in the drawings several forms which are presently preferred, it being understood, however, that the invention is not limited to the precise arrangements and instrumentalities shown.

DETAILED DESCRIPTION OF EMBODIMENTS OF THE INVENTION

Hereinafter, the preferred embodiments of the present invention are explained in detail with reference to the drawings.

An embodiment of the present invention will be described with reference to the drawings.

In a DC-DC converter according to an embodiment of the present invention instead of transmitting the voltage signal of the secondary-side circuit to the primary-side circuit by using a photocoupler, the voltage signal inputted to the primary-side circuit is monitored to stop conversion operation, in connection with the voltage signal of the secondary-side circuit, thus protection of the low voltage can be realized without employing parts of large size and high cost.

Figure 1:
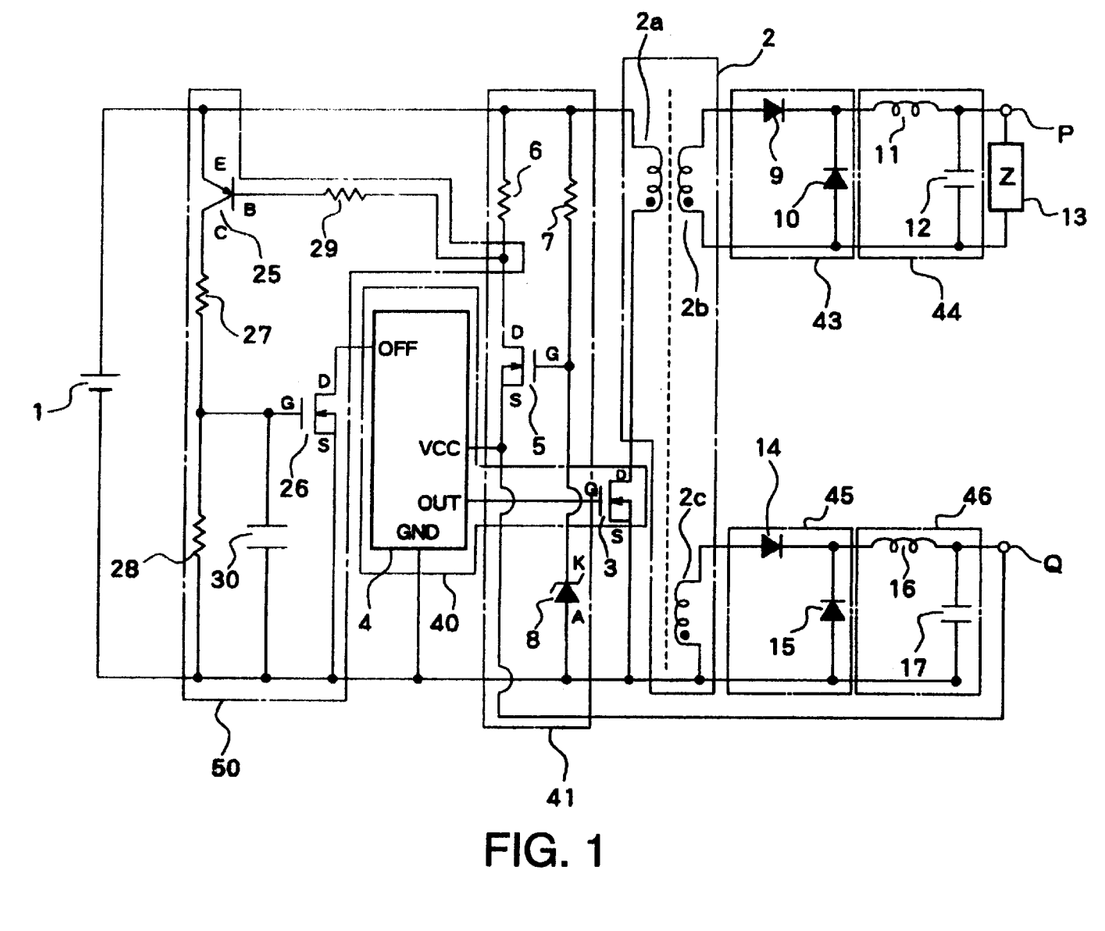
FIG. 1 is a circuit diagram of a DC-DC converter according to an embodiment of the present invention.

As shown in FIG. 1, the DC-DC converter according to an embodiment of the present invention comprises a direct current (DC) power supply 1, a transformer 2, a latch stop section 50, a PWM modulation section 40, a power supply selection section 41, a first rectifier section 43, a first smoothing section 44, a second rectifier section 45 and a second smoothing section 46. In this case, the PWM modulation section 40, the power supply selection section 41, the first rectifier section 43, the first smoothing section 44, the second rectifier section 45 and the second smoothing section 46 are the same type as the conventional ones. Therefore, a detailed explanation is omitted. A first FET 5 of the power supply selection section 41 corresponds to the first transistor of the present invention, and in this case, a control input terminal and an input terminal correspond to the gate electrode (G) and the source electrode (S) respectively. A bipolar transistor may be employed for this first FET 5.

The DC power supply 1, a primary winding 2a of the transformer 2, the PWM modulation section 40, the latch stop section 50 and the power supply selection section 41 correspond to the primary-side circuit of the present invention, the first rectifier section 43 and the first smoothing section 44 correspond to the secondary-side circuit and the second rectifier section 45 and the second smoothing section 46 correspond to the auxiliary rectifying and smoothing circuit of the present invention. Moreover, the latch stop section 50 corresponds to the monitor and the means for stopping conversion operation or the stop circuit of the present invention, the PWM modulation section 40 corresponds to the conversion means or the converter of the present invention, and the power supply selection section 41 corresponds to the power supply selection circuit.

The illustrated embodiment of the latch stop section 50 has a PNP transistor 25, a third FET (N channel MOSFET) 26, resistors 27, 28, and 29, and a capacitor 30. A base terminal (B) of the PNP transistor 25 in the latch stop section 50 is connected to a drain terminal (D) of the first FET 5 in the power supply selection section 41 via the resistor 29, and an emitter terminal (E) of the PNP transistor 25 is connected to a positive pole side of the DC power supply 1. Moreover, a collector terminal (C) of the PNP transistor 25 is connected to one end of the resistor 28, to one end of the capacitor 30 and to a gate terminal (G) of the third FET 26 via the resistor 27. Moreover, the other ends of the resistor 28 and the capacitor 30 are connected to a negative pole side (GND) of the DC power supply 1 respectively. Moreover, a drain terminal (D) of the third FET 26 is connected to the operation control input terminal (OFF) of the PWM control IC 4 in the PWM modulation section 40, and a source terminal (S) is connected to GND. The transistor 25 corresponds to the second transistor of the present invention. In this case, although a PNP transistor is employed, a MOSFET may be employed for the second transistor of the present invention.

The latch stop section 50 of the present invention will now be explained. The latch stop section 50 senses that the power supply selection section 41 selectively supplies the power supply voltage from the DC power supply 1 to the PWM control IC 4 via the base terminal (B) of the transistor 25, and this causes the emitter terminal (E) and the collector terminal (C) of the PNP transistor 25 to be conductive, and allows the third FET 26 to conduct to set the operation control terminal (OFF) to the L-level after the time constant determined by the resistor 27 and the capacitor 30 elapses.

Next, operation of the DC-DC converter unit according to the embodiment of the present invention is explained. First, during starting, since the sub-power supply voltage is not supplied to the source terminal (S) of the first FET 5, and the potential of the gate electrode (G) is fixed to the predetermined Zener potential to GND by the Zener diode 8, a potential difference is generated between the source terminal (S) and the gate terminal (G), and the drain terminal (D) conducts with the source terminal (S), then the power supply voltage from the DC power supply 1 is supplied to the power supply terminal Vcc of the PWM control IC 4 via the resistor 6. The PWM control IC 4 outputs a PWM controlled signal from the signal output terminal (OUT), and the main switch 3 converts current flowing through the primary winding 2a of the transformer 2 into AC current.

At this time, although the PNP transistor 25 is turned ON via the transistor 29, and current flows from the emitter terminal (E) to the collector terminal (C), the potential difference between the gate terminal (G) and the source terminal (S) of the third FET 26 is not sufficient. Accordingly, the third FET 26 is maintained in an OFF state.

On the other hand, induced current is generated in the secondary winding 2b by the current flowing through the primary winding 2a, and the induced current is also generated in the tertiary winding 3c. Then, the induced current generated in the secondary winding 2b is rectified by the first rectifier section 43, and is smoothed by the first smoothing section 44 to be supplied to the load 13.

Furthermore, the induced current generated in the tertiary winding is rectified by the second rectifier section 45 and is smoothed by the second smoothing section 46, then conducts with the source terminal (S) of the first FET 5 and sub-power supply voltage is supplied to the source terminal (S) of the first FET 5 via the terminal Q. In this case, it is known that the sub-power supply voltage is roughly proportional to voltage appearing on the terminal P.

Accordingly, the potential difference between the source terminal (S) and the gate terminal (G) of the first FET 5 becomes smaller and the first FET 5 is turned to the OFF state, and the sub-power-source voltage generated by the auxiliary rectifying and smoothing circuit is also supplied to the power supply voltage Vcc of the PWM control IC4.

After completion of starting in this way, in a steady state, since the first FET is in an OFF state, the current does not flow via the resistor 6. Accordingly, since the PNP transistor 25 is controlled to be in an OFF state and conduction between the emitter terminal (E) and the collector terminal (C) is cut off, the third FET 26 is maintained in the OFF state.

Next, an explanation is made regarding the DC-DC converter of the embodiment of the present invention, in which the output voltage of the secondary-side circuit is lower than the predetermined potential due to short circuit of the load 13 in a steady state. In a steady state, when the output voltage on the secondary-side circuit is decreased due to the short circuit of the load 13 and the potential appearing in the terminal Q of the auxiliary rectifying and smoothing circuit is decreased in proportion to it, a potential difference between the source terminal (S) and the gate terminal (G) of the first FET 5 is generated, and the first FET 5 is in an ON state, then the drain terminal (D) conducts with the source terminal (S) and current flows via the resister 6. Subsequently, the PNP transistor 25 turns to the ON state via the resistor 29, and current flows between the emitter terminal (E) and the collector terminal (C). If this state continues for longer than the time constant determined by the resistor 27 and the capacitor 30, the potential of the gate terminal (G) of the third FET 26 rises to allow the third FET 26 to be turned to the ON state, the operation control input terminal (OFF) of the PWM control IC 4 is in a state that it is connected to GND (L-level), and PWM control IC 4 will not output the PWM-modulated signal. Accordingly, the main switch stops its switching operation to stop conversion operation to AC, power is not supplied to the secondary-side circuit, power supply to the load 13 is cut off, and the sub-power supply voltage is not outputted. As results, the PNP transistor 25 is maintained in an ON state and the circuit is latched.

As explained above, according to the DC-DC converter of the present invention, protection of the output low voltage can be realized without employing circuit elements having large size such as a photocoupler or a shunt regulator.

Furthermore, a circuit for stopping operation of the PWM control IC 4 upon receiving a remote control signal from outside may be added, and when the power source voltage of the DC power source 1 decreases, the circuit for stopping operation of the PWM control IC 4 may also be added. Therefore, the DC-DC converter unit to which such a circuit is added is explained in reference to FIG. 2.

Figure 2:
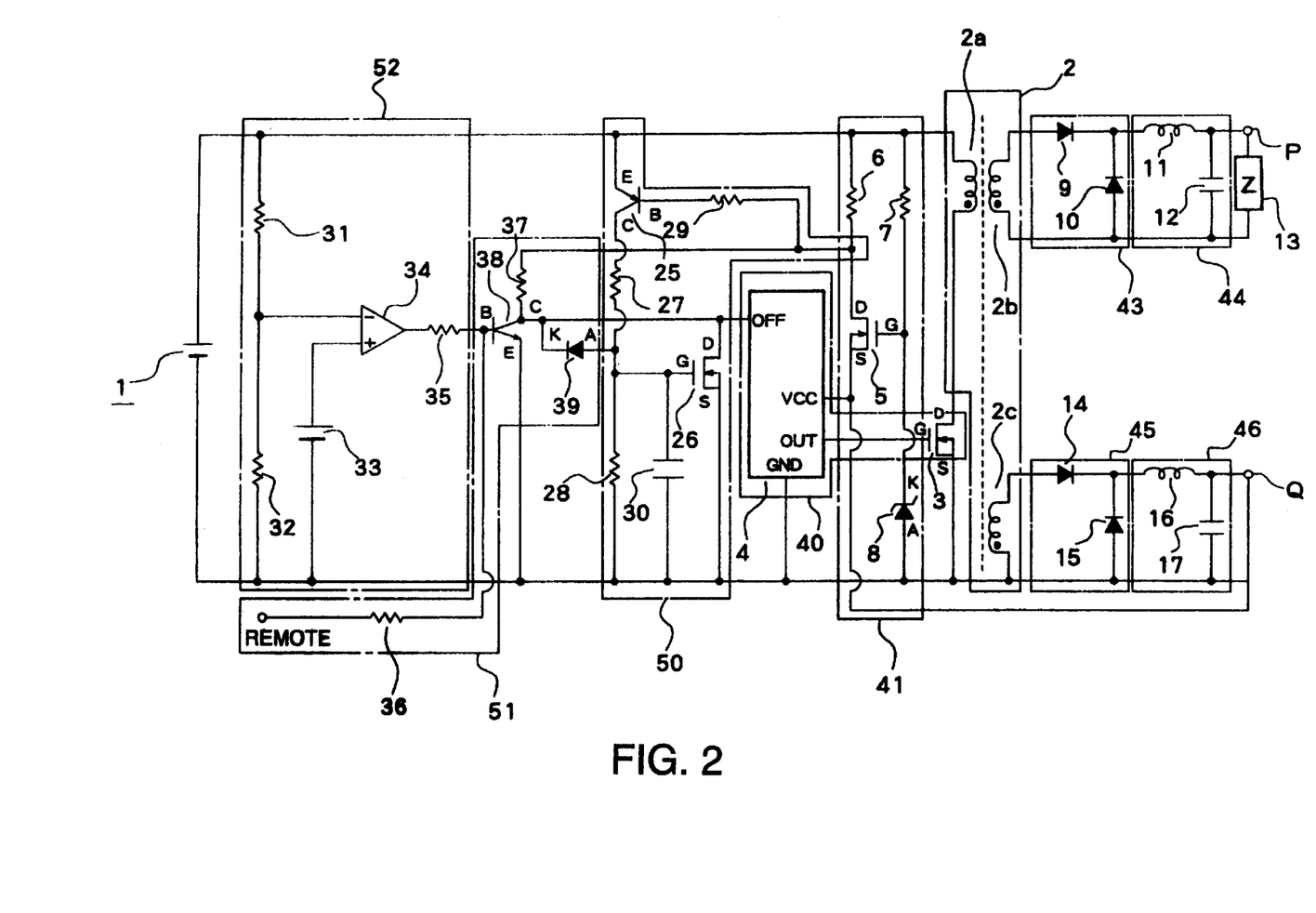
FIG. 2 is a circuit diagram of a DC-DC converter according to an embodiment of the present invention.

As shown in FIG. 2, these DC-DC converters comprise of a DC power supply 1, a transformer 2, a latch stop section 50, a PWM modulation section 40, a power supply selection section 41, a first rectifier section 43, a first smoothing section 44, a second rectifier section 45, a second smoothing section 46, an operation control section 51 and an input low voltage protection section 52. The DC power supply 1, the transformer 2, the latch stop section 50, the PWM modulation section 40, the power supply selection section 41, the first rectifier section 43, the first smoothing section 44, the second rectifier section 45 and the second smoothing section 46 are the same as the ones explained with reference to FIG. 1. Therefore, detailed explanations are omitted.

In the illustrated embodiment, the operation control section 51 comprises resistors 36 and 37, an NPN transistor 38 and a diode 39, and the input low voltage protection section 52 comprises dividing resistors 31 and 32, a reference voltage 33, an operational amplifier and a resistor 35.

A collector terminal (C) of the NPN transistor 38 of this operation control section 51 is connected to a drain terminal (D) of the first FET 5 of the power supply selection section 41, an operation control terminal (OFF) of the PWM control IC 4 of the PWM modulation section 40 and a cathode terminal (K) of the diode 39 via the resistor 37, an emitter terminal (E) is connected to GND, and a base terminal (B) is connected to a remote input terminal (Remote) via the resistor 36. An anode terminal (A) is connected to a gate electrode (G) of the first FET of the power supply selection section 41.

Furthermore, an output terminal of the operational amplifier 34 of the input low voltage protection section 52 is connected to a base terminal (B) of the NPN transistor 38 of the operation control section 51 via the resistor 35, a noninverting input terminal (+) is connected to a positive side of the reference power supply 33, and an inverting input terminal (−) is connected to one end of a dividing resistor 31 and one end of a dividing resistor 32. The other end of the dividing resistor 31 is connected to the positive pole side of the DC power supply 1, and the other end of the dividing resistor 32 is connected to the negative side (GND) of the DC power supply 1. Moreover, the negative pole side of the reference power supply 33 is connected to GND.

Operations of the operation control section 51 are now explained. First, while the remote input terminal is set to the L-level, the NPN transistor 38 is in an OFF state, the collector terminal (C) does not conduct with the emitter terminal (E), and operation of the circuit explained in FIG. 1 is not influenced at all. On the other hand, when the remote input terminal is set to the H-level, since the NPN transistor 38 is turned ON, the collector terminal (C) conducts with the emitter terminal (E), the operation control input terminal (OFF) become L-level, the PWM control IC 4 does not output the PWM-controlled signal, the conversion operation by the main switch 3 is stopped, and the power supply voltage is not supplied to the load 13. At this time, although the PNP transistor 25 is turned ON, since the charge of the capacitor 30 is discharged by diode 39, latch stop never occurred by input from the remote input terminal during stopping of operation of the circuit. That is, this diode 39 corresponds to a circuit to prevent latch stop during stop control.

Furthermore, operation of the input low voltage protection section 52 now explained. First, while the DC power supply 1 maintains the predetermined power supply voltage, the potential which is partially reduced by the dividing resistors 31 and 32 to be supplied to the inverting input terminal is almost equivalent to the voltage which is supplied to noninverting input terminal of the operational amplifier 34 by the reference power supply 33, and output from the operational amplifier 34 is at the L-level. Therefore, the NPN transistor 38 of the operation control section 51 is never turned ON. As a result, operation of the other circuit components are never influenced.

On the other hand, as the power supply voltage of the DC power supply decreases, the potential of the voltage supplied to the inverting input terminal of the operational amplifier 34 becomes lower than the potential of the voltage supplied to the non-inverting input terminal from the reference supply 33, and output from the operational amplifier is at the H-level. As a result, the NPN transistor is controlled to be ON via the resistor 35. As explained in connection with the operation control section 51, the power supply voltage is then not supplied to the load 13. In this case, although the PNP transistor 25 is also turned ON, since the charge on the capacitor is discharged by diode 39, latch stop never occurred by input from the remote input terminal during stopping of operation of the circuit.

Further, control from the remote input terminal is not needed. If the input low voltage protection section 52 is desired to be provided, the resistors 37 and 36 are not needed.

Figure 3:
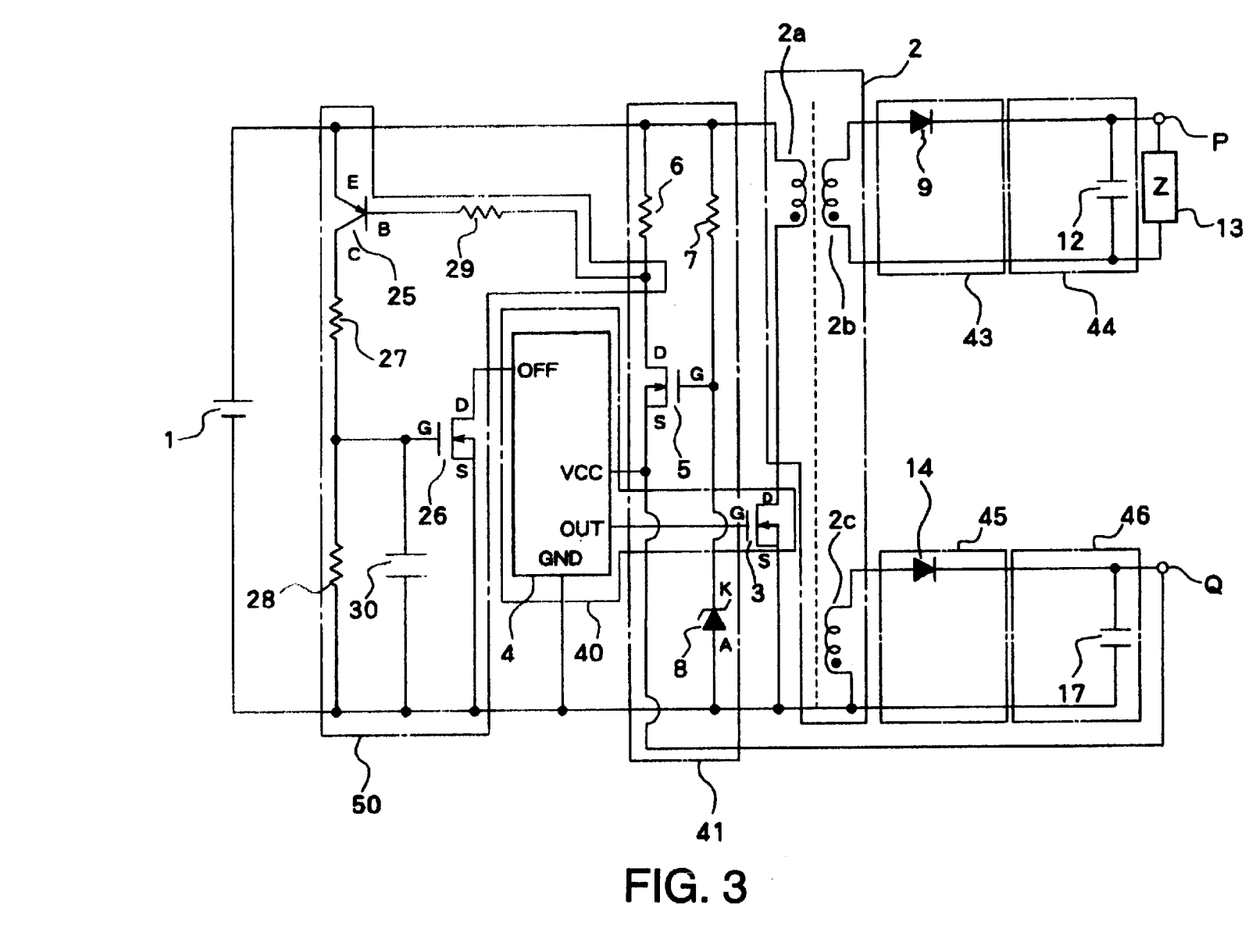
FIG. 3 is a circuit diagram of a DC-DC converter according to an embodiment of the present invention.

Furthermore, the DC-DC converter of FIGS. 1 and 2, shown as only a forward converter, may instead by a flyback converter. In this case, shown in FIG. 3, the first and second rectifiers 43 and 45 comprise a diode 9 and 1 respectively, and the first and second smoothing circuit 44 and 46 comprise a capacitor 12 and 17, respectively.

While preferred embodiments of the invention have been disclosed, various modes of carrying out the principles disclosed herein are contemplated as being within the scope of the following claims. Therefore, it is understood that the scope of the invention is not to be limited except as otherwise set forth in the claims.

What is claimed is:

1. A DC-DC converter comprising:
a primary-side circuit connecting to a DC power supply and provided with a converter performing a conversion operation converting a voltage supplied by said DC power supply into an AC signal;
a secondary-side circuit for rectifying and smoothing the AC signal supplied by said primary-side circuit to supply power to a load; and
an auxiliary rectifying and smoothing circuit rectifying and smoothing the AC signal supplied by said primary-side circuit to supply sub-power supply voltage to said converter of said primary-side circuit;
wherein, said primary-side circuit includes a monitor circuit monitoring the sub-power supply voltage supplied from said auxiliary rectifying and smoothing circuit to said converter and a latch circuit for latching the conversion operation of said converter into an OFF state; and
an operation control circuit provided with an operation control terminal for stopping the conversion operation of said conversion circuit according to a signal provided to said operation control terminal and for preventing latching by said latch circuit during stopping of the conversion operation by the signal provided to the operation control terminal.

2. The DC-DC converter of claim 1, further comprising:
an input low voltage protection circuit monitoring the power supply voltage of said DC power supply to control the conversion operation of said conversion circuit to stop said conversion operation when the power supply voltage of said DC power supply is lower than a predetermined voltage and for preventing latching of the conversion operation during the stopping of the conversion operation when the power supply voltage of the DC power supply is lower than the predetermined voltage.

3. The DC-DC converter of claim 2, wherein,
said conversion circuit is provided with a pulse-width conversion controller comprising a power supply terminal, a control terminal for stop controlling pulse-width conversion and a terminal for receiving a signal whose pulse width is to be converted and further comprising a main switch element for receiving at a control input a signal whose pulse width is converted by the pulse-width conversion controller to allow main terminals of the main switch element to conduct according to the signal whose pulse width is converted, said power supply selection circuit including a first transistor provided with a control input terminal which is fixed to a predetermined potential with respect to a ground potential, an input terminal supplied with said power-supply voltage of said DC power supply and an output terminal supplied with said sub-power supply voltage, the first transistor allowing said input terminal to conduct with said output terminal to supply the power-supply voltage from said DC power supply to the power supply terminal of the conversion circuit via the output terminal before said sub-power supply voltage reaches the predetermined potential, said sub-power supply voltage being supplied to the power supply terminal of said conversion circuit without said input terminal conducting with said output terminal when said sub-power supply voltage exceeds the predetermined potential, and said stop circuit including a second transistor for transmitting a signal for stop control to said control terminal of the conversion circuit upon sensing a current signal flowing into the input terminal of the first transistor.

4. The DC-DC converter of claim 3, wherein the stop circuit further comprises a time constant circuit comprising an R-C circuit and further comprising a further transistor, the second transistor causing a capacitor of the R-C circuit to charge when said second transistor senses the current signal flowing into the input terminal of the first transistor, the charge on said capacitor causing said further transistor to latch said conversion circuit into an OFF state whereby the conversion operation is stopped.

5. A DC-DC converter comprising:

a primary-side circuit provided with a DC power supply and a conversion circuit performing a conversion operation converting a voltage supplied by said DC power supply into an AC signal;

a secondary-side circuit for rectifying and smoothing the AC signal supplied by said primary-side circuit to supply power to a load;

an auxiliary rectifying and smoothing circuit for rectifying and smoothing said AC signal supplied by said primary-side circuit to output a sub-power supply voltage, said auxiliary rectifying and smoothing circuit includes a power supply selection circuit supplying a power supply voltage from said DC power supply when the conversion circuit starts and selectively supplying the sub-power supply voltage from said auxiliary rectifying and smoothing circuit in a steady state, and a stop circuit for monitoring said sub-power supply voltage to latch the conversion operation of said conversion circuit to an OFF state when the sub-power supply voltage decreases; and an input low voltage protection circuit monitoring the power supply voltage of said DC power supply to control the conversion operation of said conversion circuit to stop said conversion operation when the power supply voltage of said DC power supply is lower than a predetermined voltage and for preventing latching of the conversion operation during the stopping of the conversion operation when the power supply voltage of the DC power supply is lower than the predetermined voltage.

6. The DC-DC converter of claim 5, further comprising:

an operation control circuit provided with an operation control terminal and stopping the conversion operation of said conversion circuit according to a signal provided to said operation control terminal and further preventing latching by said stop circuit during stopping of the conversion operation by the signal provided to the operation control terminal.

7. The DC-DC converter of claim 6, wherein, said conversion circuit is provided with a pulse-width conversion controller comprising a power supply terminal, a control terminal for stop controlling pulse-width conversion and a terminal for receiving a signal whose pulse width is to be converted and further comprising a main switch element for receiving at a control input a signal whose pulse width is converted by the pulse-width conversion controller to allow main terminals of the main switch element to conduct according to the signal whose pulse width is converted, said power supply selection circuit including a first transistor provided with a control input terminal which is fixed to a predetermined potential with respect to a ground potential, an input terminal supplied with said power-supply voltage of said DC power supply and an output terminal supplied with said sub-power supply voltage, the first transistor allowing said input terminal to conduct with said output terminal to supply the power-supply voltage from said DC power supply to the power supply terminal of the conversion circuit via the output terminal before said sub-power supply voltage reaches the predetermined potential, said sub-power supply voltage being supplied to the power supply terminal of said conversion circuit without said input terminal conducting with said output terminal when said sub-power supply voltage exceeds the predetermined potential, and said stop circuit including a second transistor for transmitting a signal for stop control to said control terminal of the conversion circuit upon sensing a current signal flowing into the input terminal of the first transistor.

8. The DC-DC converter of claim 7, wherein the stop circuit further comprises a time constant circuit comprising an R-C circuit and further comprising a further transistor, the second transistor causing a capacitor of the R-C circuit to charge when said second transistor senses the current signal flowing into the input terminal of the first transistor, the charge on said capacitor causing said further transistor to latch said conversion circuit into an OFF state whereby the conversion operation is stopped.

9. The DC-DC converter of claim 5, wherein, said conversion circuit is provided with a pulse-width conversion controller comprising a power supply terminal, a control terminal for stop controlling pulse-width conversion and a terminal for receiving a signal whose pulse width is to be converted and further comprising a main switch element for receiving at a control input a signal whose pulse width is converted by the pulse-width conversion controller to allow main terminals of the main switch element to conduct according to the signal whose pulse width is converted, said power supply selection circuit including a first transistor provided with a control input terminal which is fixed to a predetermined potential with respect to a ground potential, an input terminal supplied with said power-supply voltage of said DC power supply and an output terminal supplied with said sub-power supply voltage, the first transistor allowing said input terminal to conduct with said output terminal to supply the power-supply voltage from said DC power supply to the power supply terminal of the conversion circuit via the output terminal before said sub-power supply voltage reaches the predetermined potential, said sub-power supply voltage being supplied to the power supply terminal of said conversion circuit without said input terminal conducting with said output terminal when said sub-power supply voltage exceeds the predetermined potential, and said stop circuit including a second transistor for transmitting a signal for stop control to said control terminal of the conversion circuit upon sensing a current signal flowing into the input terminal of the first transistor.

10. The DC-DC converter of claim 9, wherein the stop circuit further comprises a time constant circuit comprising an R-C circuit and further comprising a further transistor, the second transistor causing a capacitor of the R-C circuit to charge when said second transistor senses the current signal flowing into the input terminal of the first transistor, the charge on said capacitor causing said further transistor to latch said conversion circuit into an OFF state whereby the conversion operation is stopped.

11. A DC-DC converter including:
a primary-side circuit provided with a DC power supply and a conversion circuit converting a voltage supplied by said DC power supply into an AC voltage signal;
a secondary-side circuit for rectifying and smoothing the AC signal supplied by said primary-side circuit to supply power to a load;
an auxiliary rectifying and smoothing circuit rectifying and smoothing the AC signal supplied by said primary-side circuit to output as a sub-power supply voltage;
a power supply selection circuit for selectively supplying a power supply voltage to said conversion circuit, and including a first transistor provided with a control input terminal which is fixed to a predetermined potential with respect to a ground potential, an input terminal supplied with the power supply voltage of said DC power supply, and an output terminal supplied with said sub-power supply voltage, wherein the first transistor allows said input terminal to conduct with the output terminal to supply the power supply voltage from said DC power supply to the power supply terminal of said conversion circuit via the output terminal before said sub-power supply voltage reaches the predetermined potential, said sub-power supply voltage being supplied to the power supply terminal of said conversion circuit without said input terminal conducting with the output terminal when said sub-power supply voltage exceeds the predetermined potential, and said input terminal is allowed to conduct to the output terminal to supply the power supply voltage from said DC power supply to the power supply terminal of said conversion circuit via the output terminal when said sub-power supply voltage is less than the predetermined potential; and a stop circuit connected to said input terminal of said first transistor to detect the power supply voltage from said DC power supply and to latch the conversion operation of said conversion circuit upon detection of the power supply voltage.

12. The DC-DC converter of claim 11, further comprising:
an operation control circuit provided with an operation control terminal to stop the conversion operation of said conversion circuit according to a signal that is input into said operation control terminal and to prevent latching by said stop circuit while the conversion of the conversion circuit is stopped.

13. The DC-DC converter of claim 11, further comprising:
an input low voltage protection circuit for monitoring the power supply voltage of said DC power supply to control the conversion operation of said conversion circuit so as to stop the conversion operation when said power supply voltage is lower than a predetermined voltage and for preventing latching by said stop circuit while the conversion operation of the conversion operation is stopped.

14. The DC-DC converter of claim 11, wherein said conversion circuit comprises a pulse-width conversion control element provided with a power supply terminal, a control terminal for stopping the pulse-width conversion operation, and a terminal for outputting a signal having a pulse width that is converted, and a main switch element for receiving at a gate terminal said signal having a pulse width that is converted, for conducting between a drain terminal and a source terminal according to the signal having the pulse width that is converted, and for converting the power supply voltage of said DC power supply into an AC signal, and said stop circuit includes a second transistor for transmitting a signal for controlling the control terminal of said conversion circuit upon sensing a current signal flowing into the input terminal of said first transistor.

* * * * *